Aug. 20, 1940.  L. CAMPBELL, JR., ET AL  2,211,810
AUTOMATIC CONTROL FOR FUEL FEED AND DRAFT REGULATING MECHANISMS
Filed Dec. 1, 1937  2 Sheets-Sheet 1
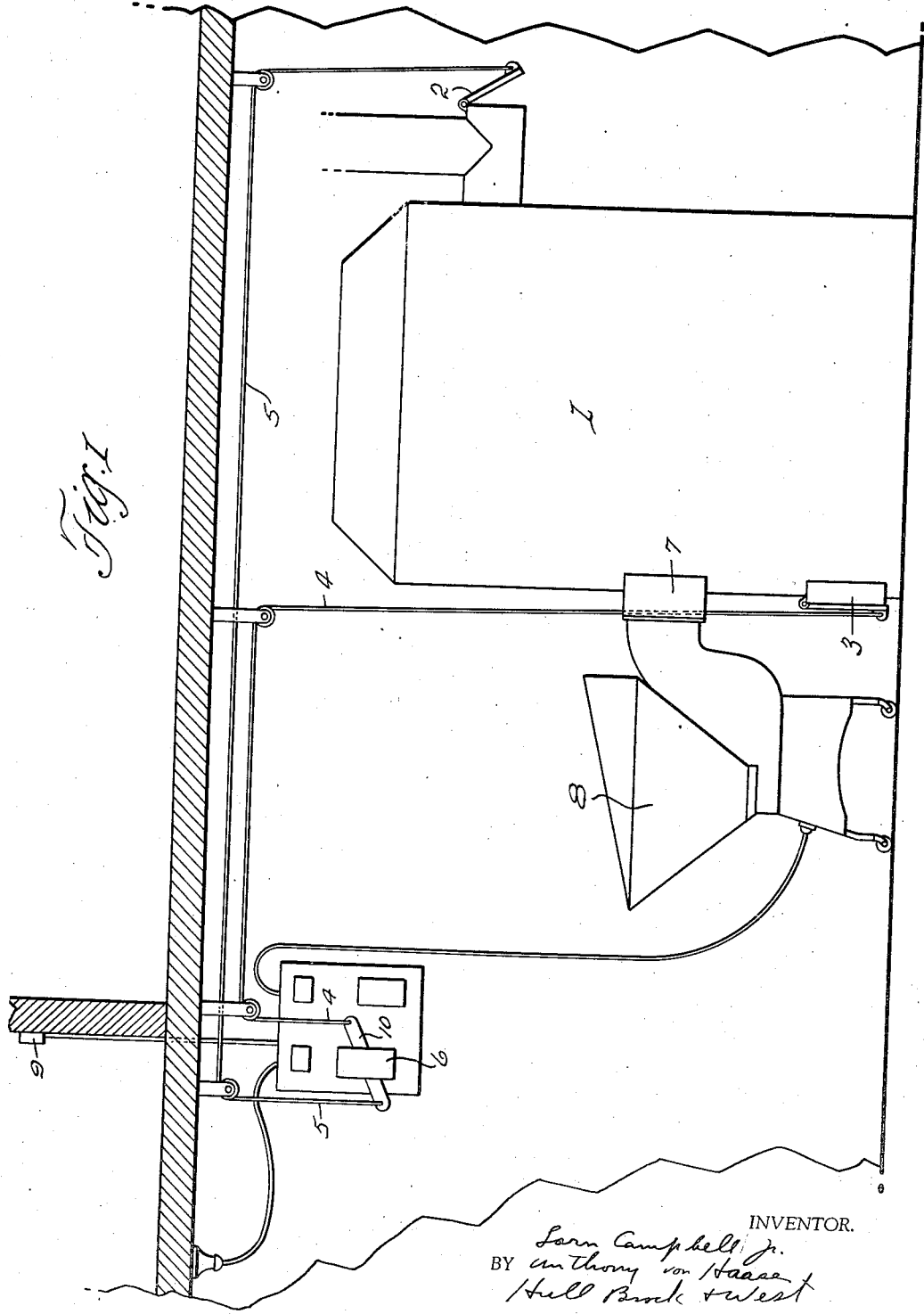
INVENTOR.
Lorn Campbell Jr.
BY Anthony von Haase
Hull Brock & West
ATTORNEY.

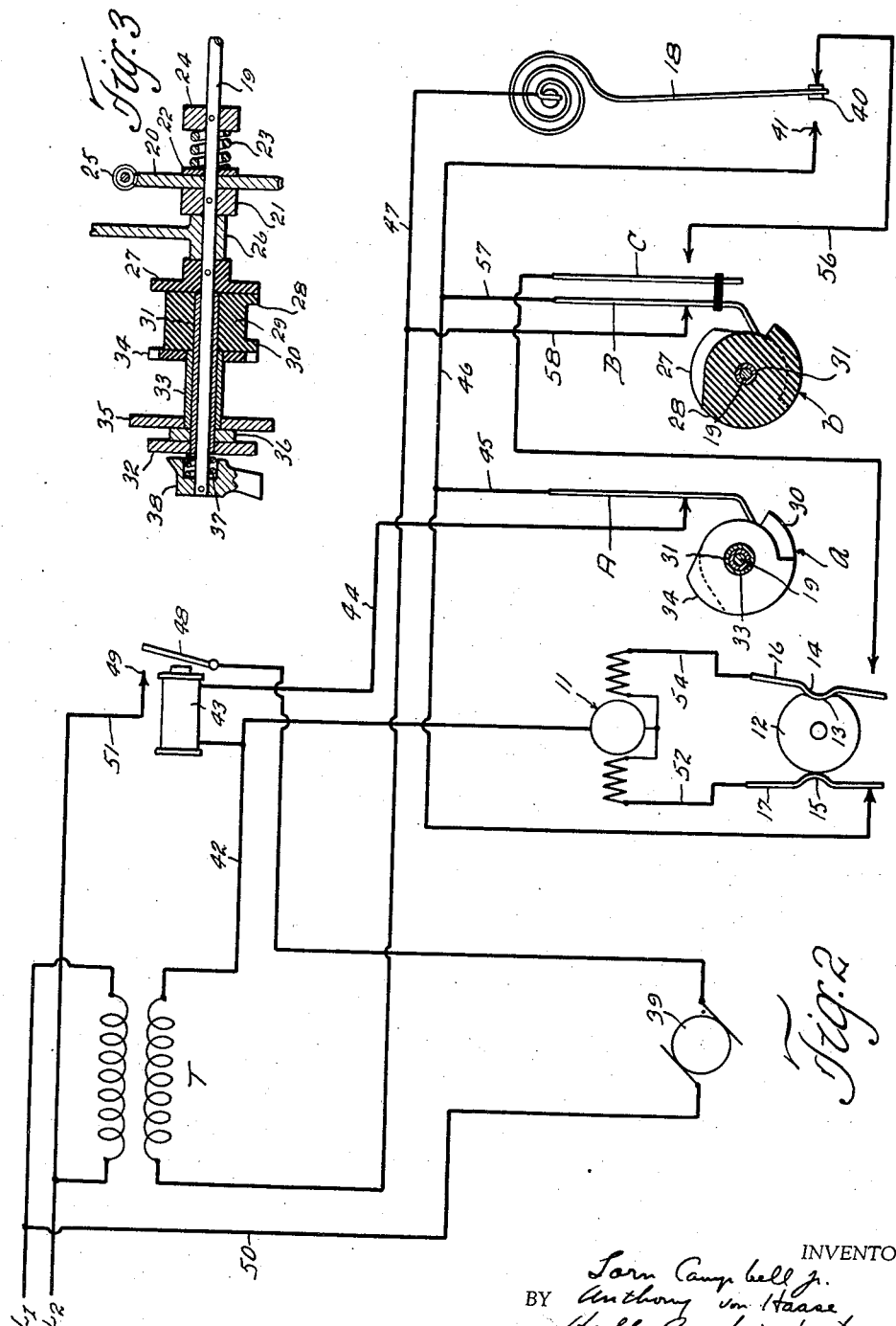

Patented Aug. 20, 1940

2,211,810

UNITED STATES PATENT OFFICE 2,211,810

AUTOMATIC CONTROL FOR FUEL FEED AND DRAFT REGULATING MECHANISMS

Lorn Campbell, Jr., and Anthony von Haase, Lakewood, Ohio, assignors, by mesne assignments, to Lorn Campbell, Jr.

Application December 1, 1937, Serial No. 177,642

5 Claims. (Cl. 236—46)

This invention relates to an automatic control for a mechanical stoker and the draft mechanism of a furnace fed thereby, and is especially suitable for an installation which relies entirely upon natural or thermal draft and makes use of no forced draft.

The principal object of the invention is to provide such an automatic control wherein the operation of the stoker will be dependent upon the condition of a thermostat and also upon the condition of a time controlled device; wherein the draft mechanism of the furnace will always be in open or fuel burning condition when the stoker is running; and wherein the draft mechanism may remain open while the stoker is not running for the purpose of inducing continued combustion of fuel already supplied, although such draft mechanism is normally operated to closed or damping position when the thermostat reaches a predetermined high temperature condition, that is to say, when the thermostat is satisfied and is not calling for heat.

A further object is to provide, in combination with mechanism for realizing the above object, time controlled means for causing periodic operation of the stoker during a predetermined short time, which may be termed a kindling period, such operation being independent of the condition of the thermostat so that the fire may not go out even when the thermostat fails for long periods to call for heat, as in mild weather, the draft mechanism being always open when the stoker is running. A further object is to provide a novel time controlled mechanism for realizing the above stated objects.

Other and more limited objects will be in part apparent and in part pointed out hereinafter in connection with the accompanying drawings wherein Fig. 1 is a diagram showing the general arrangement of furnace, stoker and controls; Fig. 2 is a wiring diagram indicating schematically the construction and connections of the various control elements; and Fig. 3 is a detail section showing the novel time controlled mechanism referred to.

In Fig. 1 we have shown a furnace 1 of usual construction which may be of the hot air, vapor or steam type and provided with the usual dampers 2 and 3 operated by means of flexible elements 4 and 5 by a damper motor 6 of usual construction. Applied to the fuel receiving door 7 of the furnace 1 is a mechanical stoker 8 which may be provided with a supporting base, fuel receiving hopper and any desirable feed means for introducing fuel into the furnace 1. The furnace and stoker are shown as being located in a basement while the thermostat 9 is located on the floor above, for example, in a living room.

The damper motor 6 comprises a lever 10, and a reversible motor 11 adapted to move the lever 10 back and forth between different angular positions whereby to actuate the dampers 2 and 3. The motor 11 may take the form of a universal motor having two independent field windings each connected in series with the armature and such fields being so wound as to impart rotation to the motor in opposite directions. Connected with the armature of the motor 11 by suitable reduction gearing (not shown) is a control element 12 in the form of a disk provided with a depression 13 adapted to receive curved portions 14 and 15 of movable switch elements 16 and 17 at predetermined limiting positions of the lever 10. Thus, when the damper motor has moved to a point where the switches 16 and 17 occupy the relative positions shown in Fig. 2, it will be necessary that the motor 11 be energized through the switch 17 to move the lever 10 to a different position before the motor can again be energized to move in the direction which resulted in opening the switch 16.

The thermostat 18 may be of conventional construction, preferably of the type which moves from one contact to the other by an overcentering or snap action, although it is shown for purposes of simplicity as a simple bimetal thermostat.

The time controlled mechanism of Fig. 3 comprises a shaft 19 driven at constant speed through the medium of a gear 20 frictionally attached to the shaft 19 by means of a collar 21 and disk 22, the disk 22 being held in contact with the gear 20 by means of a spring 23 interposed between such disk and a collar 24. The gear 20 is driven by a worm 25 which in turn is rotated at a constant speed by any desired means such as an electric motor and suitable reduction gearing, clock work, either spring or electrically driven or any other equivalent or similar means. The shaft 19 is mounted in a bearing 26 intermediate its ends and preferably in an additional bearing at the right hand end (not shown). Pinned to the shaft 19 is a cam element 27 which cooperates with a cam element 28 to form a composite cam which is adjustable as to length and which is indicated generally by the reference character b. The cam element 28 is formed on a cam cylinder 29 which also carries a cam element 30. The cam cylinder 29 is non-rotatably secured to a sleeve 31 received on the shaft 19 and which sleeve extends to the left and has attached thereto a regulating dial 32 by means of which the cam cylinder 29 and consequently the cam elements 28 and 30 may be adjusted. Received on the sleeve 31 is a sleeve 33 carrying at its right hand end a cam element 34 and at its left hand end a regulating dial 35. The cam elements 30 and 34 make up a composite cam which is of adjustable length and which is indicated generally by the reference character a.

The dials 32 and 35 are spaced apart by a spacing element 36 and the various elements carried by the shaft 19 are urged into frictional contact by a spring 37 interposed between the dial 32 and a manipulating handle 38 pinned to the shaft 19. Inasmuch as the shaft 19 is driven by the gear 20 through a friction clutch, it is obvious that the entire assembly may be rotated with respect to the gear 20 by means of the handle 38 thereby to position the cams at any desired point immediately by manual manipulation. Conveniently mounted in operative relation to the composite cams a and b are switches A and B, respectively. It is to be understood that the portion of the switches A and B which contact the composite cams a and b are sufficiently wide to be operated upon by either of the cam elements making up the composite cams associated with said switches, respectively. Thus, when the cam elements of each composite cam are set as indicated in Fig. 2 the resulting composite cams operate to maintain the switches A and B open longer than either of the cam elements alone would do. The composite cam b is shown in Fig. 2 as being set in such manner that the switch B of the composite cam b is closed for only a short portion of the time occupied by each revolution of the shaft 19. Mechanically interconnected with the movable element of the switch B is a similar movable element of a switch C, the connections being such that when the switch B is closed, switch C is open and vice versa.

In describing the operation of the control mechanism illustrated, it will be convenient to assume a condition in which the cam elements 27 and 28 making up the composite cam b so overlap as to hold the switch B open and the switch C closed during the entire revolution of the shaft 19. The cam elements 30 and 34 may be assumed to occupy any relative positions desired, for example that indicated in Fig. 2. With this cam setting, the stoker will operate, being driven by the stoker motor 39, when the switch A is closed and the thermostat 18 calls for heat, that is, when the contact 40 is in engagement with the contact 41, the circuit being from the transformer T through conductor 42, relay winding 43, conductor 44, switch A, conductor 45, conductor 46, thermostat 18 and conductor 47 back to the transformer T. Energization of the relay 43 causes the armature 48 thereof to engage contact 49 whereupon current flows from L' through conductor 50, stoker motor 39, relay armature 48 and conductor 51 to L². Closing of the thermostatic switch 40—41 will also result in energizing the damper motor 11 to actuate the draft mechanism to fuel burning or open position, the circuit being from the transformer T through the conductor 42, damper motor 11, conductor 52, switch element 17, conductor 46, thermostat 18 and conductor 47 back to transformer T. It should be noted that this last circuit depends upon the thermostat 18 and is independent of the switch A. However, the damper 3 will always be open when the stoker motor 39 is running since the thermostat 18 must call for heat and the switch A must be closed in order to operate the stoker motor 39. Since the operation of the stoker motor depends upon the thermostat 18, the breaking of the circuit by the thermostat assuming a predetermined high temperature condition, or, so to speak, being satisfied, the stoker motor will stop whether or not the switch A has opened. Usually the shaft 19 will rotate one or more times before the thermostat is satisfied so that normally it is to be expected that the stoker motor will run until the switch A is opened, the thermostat still calling for heat. After a time, whether it be part of the rotation of the shaft 19 or a plurality of rotations thereof, the thermostat 18 will be satisfied and a circuit will be closed which will result in actuating the dampers to closed or damping position. The circuit for closing the damper is from the transformer T through the conductor 42, damper motor 11, conductor 54, switch element 16, conductor 55, switch C, conductor 56, thermostat 18 and conductor 47 back to the transformer T. It is thus clear that the amount of fuel which is fed to the furnace is dependent upon the fuel requirements determined by the thermostat 18 and the closing of the switch A.

The above operation assumes, as stated, that the cam elements 27 and 28 are so set as to avoid the closing of the switch B and to maintain the switch C always closed.

In order that the fire may not be permitted to go out in mild weather when the thermostat fails for long periods of time to call for heat, we provide the composite cam b and associated mechanism adapted, so to speak, to suspend for a time the above described operation and during such suspension cause the draft mechanism to open and the stoker to run for a predetermined small part of the time required for each revolution of the shaft 19. This short interval of firing which is independent of the thermostat is termed a kindling period and consequently the composite cam b may be termed a kindling cam. The cam elements 28 and 30 being located on the cam cylinder 29 and therefore fixed with respect to each other, insure the adjustment of the cam elements 27 and 28 to a position to close the switch B and open the switch C during a part of the time that the switch A is closed. In the arrangement shown, switches A and B close at the same time when the cams are set as indicated in the drawings. With the cams so set, during the time when the switch B is closed the stoker motor 39 will run irrespective of the condition of the thermostat 18, the circuit being from the transformer T through conductor 42, relay 43, conductor 44, switch A, conductor 45, conductor 46, conductor 57, switch B, conductor 58 and conductor 47 back to the transformer T. It will be noted that this circuit does not include the thermostat 18. At the same time the draft mechanism will cause the dampers to assume open or fuel burning position, the circuit being from transformer T through conductor 42, damper motor 11, conductor 52, switch element 17, conductor 46, conductor 57, switch B, conductor 58 and conductor 47 back to transformer T. Should the damper 3 be already in the open position, this circuit will not be completed since the switch 17 will then be open and there will be no need to operate the damper motor 11.

With the exception of the time during which the switch B is closed and the switch C has consequently been opened to break the damper closing circuit through the thermostat 18, the relations of the parts and the operation will be as described when it was assumed that the switch B would always be open and the switch C always closed. If the draft mechanism should be in open position at the time the switch B opens, it will not be changed by the opening of such switch. If, however, the draft mechanism is in closed position at the time the switch B closes, it will be operated to open position as previously described and upon the reopening of the switch B and consequent closing of the switch C, a circuit will be completed for operating the damper motor 11. This circuit will be from the transformer T to the conductor 42, damper motor 11, conductor 54, switch element 16, conductor 55, switch C, conductor 56, thermostat 18 and conductor 47 back to the transformer T. It will be noted that this circuit involves thermostat 18. Should it occur that during the time the switch B is closed, the thermostat 18 should move to a position calling for heat, then the circuit for moving the draft mechanism to closed position will not be completed but in that case it will not be necessary to complete such circuit since the circuit to the stoker motor will then be closed requiring the open position of the draft mechanism.

From the foregoing it will be clear that we have provided a control system well adapted for its intended purpose and while we have shown and described the present preferred embodiment we wish it understood that we are not limited to the details of the disclosure but only in accordance with the appended claims.

Having thus described our invention, what we claim is:

1. An automatic control for a mechanical stoker and the draft mechanism of a furnace fed thereby, the same comprising, in combination, a thermostat responsive to the temperature of a compartment to be heated, a time controlled device, mear responsive to a predetermined condition of the time controlled device and a predetermined low temperature condition of said thermostat for initiating operation of said stoker and concurrently actuating said draft mechanism to open or heating position; means responsive to said time-controlled device for interrupting the operation of said stoker while the thermostat is in a low temperature condition, without actuating said draft mechanism to a closed position; and means responsive to the combined cessation of operation of said stoker and a predetermined high temperature condition of said thermostat for actuating said draft mechanism to closed or damping position.

2. In combination with a furnace having natural or thermal draft mechanism, a mechanical stoker therefor and control means for said stoker and draft mechanism, said control means comprising a thermostat responsive to the temperature of a compartment to be heated, a time controlled device, means responsive to a predetermined condition of the time controlled device and a predetermined low temperature condition of said thermostat for initiating operation of said stoker and concurrently actuating said draft mechanism to open or heating position; means responsive to said time-controlled device for interrupting the operation of said stoker while the thermostat is in a low temperature condition, without actuating said draft mechanism to a closed position; and means responsive to the combined cessation of operation of said stoker and a predetermined high temperature condition of said thermostat for actuating said draft mechanism to closed or damping position.

3. An automatic control for a mechanical stoker and the draft mechanism of a furnace fed thereby, the same comprising, in combination, a thermostat responsive to the temperature of a compartment to be heated, a time controlled device, means responsive to a predetermined condition of the time controlled device and a predetermined low temperature condition of said thermostat for causing operation of said stoker and actuating said draft mechanism to open or heating position, means responsive to cessation of operation of said stoker and a predetermined high temperature condition of said thermostat for actuating said draft mechanism to closed or damping position, and means independent of said thermostat for periodically causing operation of said stoker and concurrent operation of said draft mechanism to open position during a predetermined kindling period.

4. An automatic control for a mechanical stoker and the draft mechanism of a furnace fed thereby, the same comprising, in combination, a thermostat responsive to the temperature of a compartment to be heated, a time controlled device comprising a plurality of switches, cam means for operating said switches and time controlled means for operating said cam means, means responsive to one of said switches and a predetermined low temperature condition of said thermostat for causing periodic operation of said stoker and insuring an open or heating position of the draft mechanism, means responsive to a predetermined high temperature condition of said thermostat and an inactive condition of said stoker for actuating said draft mechanism to closed or damping position, and means independent of said thermostat for periodically causing operation of said stoker and concurrent operation of said draft mechanism to open position during a predetermined kindling period.

5. An automatic control for a mechanical stoker and the draft mechanism of a furnace fed thereby, the same comprising, in combination, a thermostat responsive to the temperature of a compartment to be heated, a time controlled device, means responsive to a predetermined condition of the time controlled device and a predetermined low temperature condition of said thermostat for initiating operation of said stoker and concurrently actuating said draft mechanism to open or heating position; means responsive to said time-controlled device for interrupting the operation of said stoker while the thermostat is in a low temperature condition, without actuating said draft mechanism to a closed position; and means independent of said thermostat for periodically causing operation of said stoker and concurrent operation of said draft mechanism to open position during a predetermined kindling period.

LORN CAMPBELL, JR.
ANTHONY VON HAASE.